US007487789B2

(12) United States Patent
Telep et al.

(10) Patent No.: US 7,487,789 B2
(45) Date of Patent: Feb. 10, 2009

(54) GASEOUS FLUID METERING VALVE

(75) Inventors: Robert J. Telep, Livonia, MI (US); Robert D. Keefover, Lake Orion, MI (US); Michael J. Halsig, Warren, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 11/453,598

(22) Filed: Jun. 15, 2006

(65) Prior Publication Data

US 2006/0237675 A1 Oct. 26, 2006

Related U.S. Application Data

(63) Continuation of application No. 10/612,329, filed on Jul. 2, 2003, now Pat. No. 7,086,636.

(60) Provisional application No. 60/393,459, filed on Jul. 2, 2002.

(51) Int. Cl.
*F16K 15/00* (2006.01)

(52) U.S. Cl. .................... 137/243; 251/77; 251/129.12; 251/227; 123/568.24

(58) Field of Classification Search ............ 251/129.11, 251/129.12, 227, 77; 123/568.23, 568.24, 123/568.22, 568.26; 137/243–243.7
See application file for complete search history.

(56) References Cited

U.S. PATENT DOCUMENTS 245,662 A 8/1881 Rinderknecht
616,275 A * 12/1898 Swenson ................. 137/243.2
1,575,449 A * 3/1926 Mozian ....................... 251/227
1,640,040 A * 8/1927 Kelly ...................... 137/243.2
1,679,898 A * 8/1928 Gilbert ....................... 251/227
1,711,593 A * 5/1929 Gilbert .................... 137/243.2
1,987,135 A 1/1935 Sugden
2,615,465 A * 10/1952 Woodward ............... 137/243.2
3,071,149 A * 1/1963 Rhodes .................. 251/129.12
3,727,631 A * 4/1973 Suezawa et al. .......... 137/243.2
4,177,825 A * 12/1979 Crawford ..................... 251/77
4,666,124 A 5/1987 Giacobbi
5,337,790 A 8/1994 Heritier-Best et al.

(Continued)

FOREIGN PATENT DOCUMENTS

EP 0588706 3/1994

(Continued)

*Primary Examiner*—John Bastianelli
(74) *Attorney, Agent, or Firm*—Warn Partners, P.C.

(57) ABSTRACT

The present invention is directed to an exhaust gas recirculation valve incorporating a DC motor and a dual poppet valve assembly. A motor is contained inside of the actuator housing. The motor has a rotatable motor shaft with a first gear connected to the end of the motor shaft. A second gear is engageable to the first gear and is configured to rotate in response to the movement of the first gear and the motor shaft. The second gear is also connected to a pin member disposed through the top portion of a shaft member that has two poppet valves disposed on to the shaft. The two ends of the pin member are slidably engageable to either an upwardly or downwardly sloped ramp portion. When the second gear rotates the shaft rotates and moves upward or downward to cause the valve members to move between an open and closed position.

33 Claims, 4 Drawing Sheets

U.S. PATENT DOCUMENTS

| | | | |
|---|---|---|---|
| 5,443,241 | A | 8/1995 | Odaira et al. |
| 5,511,531 | A | 4/1996 | Cook et al. |
| 5,588,414 | A | 12/1996 | Hrytzak et al. |
| 5,593,132 | A | 1/1997 | Hrytzak |
| 5,669,364 | A | 9/1997 | Everingham |
| 5,699,664 | A | 12/1997 | LaFleur |
| 5,704,585 | A | 1/1998 | Hrytzak et al. |
| 5,722,634 | A | 3/1998 | Hrytzak et al. |
| 5,901,690 | A | 5/1999 | Hussey et al. |
| 5,911,401 | A | 6/1999 | Hrytzak et al. |
| 5,924,675 | A | 7/1999 | Hussey et al. |
| 5,947,092 | A | 9/1999 | Hussey et al. |
| 5,950,605 | A | 9/1999 | Hussey et al. |
| 5,957,117 | A | 9/1999 | Everingham |
| 5,960,776 | A | 10/1999 | Everingham et al. |
| 5,979,866 | A | 11/1999 | Baxter et al. |
| 5,988,147 | A | 11/1999 | Everingham |
| 5,996,551 | A | 12/1999 | Schroder |
| 5,996,559 | A | 12/1999 | Busato et al. |
| 6,006,732 | A | 12/1999 | Oleksiewicz |
| 6,073,617 | A | 6/2000 | Busato et al. |
| 6,109,302 | A | 8/2000 | Bircann |
| 6,116,224 | A | 9/2000 | Cook et al. |
| 6,138,652 | A | 10/2000 | Cook et al. |
| 6,152,115 | A | 11/2000 | Busato et al. |
| 6,170,476 | B1 | 1/2001 | Cook et al. |
| 6,189,520 | B1 | 2/2001 | Cook et al. |
| 6,213,447 | B1 | 4/2001 | Bircann et al. |
| 6,217,001 | B1 | 4/2001 | Gluchowski et al. |
| 6,223,733 | B1 | 5/2001 | Busato et al. |
| 6,230,742 | B1 | 5/2001 | Bircann |
| 6,247,461 | B1 | 6/2001 | Smith et al. |
| 6,295,975 | B1 | 10/2001 | Yew et al. |
| 6,299,130 | B1 | 10/2001 | Yew et al. |
| 6,311,677 | B1 | 11/2001 | Cook et al. |
| 6,330,880 | B1 | 12/2001 | Okada et al. |
| 6,357,429 | B1 | 3/2002 | Carnevale et al. |
| 6,378,507 | B1 | 4/2002 | Gagnon |
| 6,382,151 | B2 | 5/2002 | Pierik |
| 6,390,078 | B1 | 5/2002 | Gee et al. |
| 6,390,079 | B1 | 5/2002 | Gagnon et al. |
| 6,397,798 | B1 | 6/2002 | Fiaccabrino |
| 6,409,145 | B1 | 6/2002 | Fong et al. |
| 6,415,777 | B1 | 7/2002 | Gagnon |
| 6,418,892 | B1 | 7/2002 | Donce et al. |
| 6,534,793 | B1 | 3/2003 | Heritier-Best |
| 7,007,922 | B2 * | 3/2006 | Biester et al. .......... 251/129.11 |
| 2002/0066427 | A1 | 6/2002 | McCoy et al. |

FOREIGN PATENT DOCUMENTS

| | | |
|---|---|---|
| EP | 0918925 | 4/2002 |
| EP | 0712998 | 3/2003 |
| FR | 2724976 | 3/1996 |
| FR | 2727158 | 5/1996 |
| FR | 2748780 | 11/1997 |
| FR | 2772429 | 6/1999 |
| FR | 2773847 | 7/1999 |
| FR | 2812684 | 2/2002 |
| FR | 2816660 | 5/2002 |
| FR | 2821645 | 9/2002 |
| FR | 2824380 | 11/2002 |
| JP | 8-232651 | 9/1996 |
| WO | WO97/43538 | 11/1997 |
| WO | WO99/31372 | 6/1999 |
| WO | WO 02/37008 A1 * | 5/2002 |

* cited by examiner

GASEOUS FLUID METERING VALVE

CROSS-REFERENCE TO RELATED APPLICATIONS

This application is a continuation of U.S. patent application Ser. No. 10/612,329 filed on Jul. 2, 2003 now U.S. Pat. No. 7,086,636, which claims the benefit of U.S. Provisional Application No. 60/393,459, filed Jul. 2, 2002. The disclosures of the above applications are incorporated herein by reference.

FIELD OF THE INVENTION

The present invention relates to a gaseous fluid metering valve for use in a vehicle. More particularly the present invention relates to a high flow exhaust gas recirculation (EGR) valve for an engine of a vehicle.

BACKGROUND OF THE INVENTION

Federal and State legislation require control of vehicle exhaust emissions. Oxides of Nitrogen (NOx) are among the exhaust gas emissions that must be controlled. Formation of undesirable NOx gas will occur when there is a high combustion temperature inside of the engine. In an effort to remove or reduce combustion temperatures and NOx emissions, exhaust gas recirculation (EGR) valve systems have been developed. EGR valves function by recirculating a portion of the exhaust gas back to the intake manifold where it will be combined with incoming outside air. The mixing of the exhaust gas and the outside air will displace oxygen in the air intake system. When the mixture is compressed and ignited in the cylinder, the result is a lower combustion temperature (due to the lower levels of oxygen) and a reduction in NOx.

The required EGR valve flow rate is dependant upon several factors that include the displacement of the engine and the engine load condition.

Conventional EGR valves may be actuated by pneumatic or electrical means. Pneumatically actuated valves depend upon the availability of pressure or vacuum on the vehicle and this may be an undesirable requirement. Pneumatic valves also require a means of electrically controlling the pneumatic source to allow overall electrical control of the system. An electric vacuum or pressure regulator is used to provide this control.

Operating force and stroke are factors used in the selection criteria for the type of actuator used for EGR valves. Higher flow rates require larger valves with greater area and corresponding larger strokes and higher operating forces. Lower pressure differential between the exhaust and intake manifold will require larger valves to achieve the desired flow rate. Additionally, contamination in the exhaust gas can accumulate on the valve components and cause them to stick if sufficient operating force is not available. Therefore, it is desirable to provide an EGR valve that has a high operating force, longer operating stroke, and high flow. Another desirable feature is to provide an EGR valve that has a self-cleaning action to prevent the accumulation of contaminants on the operative surface of the valve.

SUMMARY OF THE INVENTION

The present invention is directed to an vehicle gaseous fluid metering valve such as an exhaust gas recirculation valve having a valve housing adapted for routing exhaust gas from an input passage to an output passage. A valving assembly is positioned inside the valve housing and selectively exhausts gas from the input passage to the output passage. The valve assembly has at least one valve seat acting as an opening between the input passage and the output passage. At least one valve member operates with the valve seat and acts as a moveable barrier between the input and output passages. A valve shaft is connected to the valve member and is configured to move the valve member upward and downward between the open and closed positions and positions therebetween.

An actuator rotates the valve shaft for moving the valve member in an axial direction in response to rotational movement of the valve shaft.

The invention disclosed is an EGR valve that will provide high operating force, longer operating stoke, and high flow rate. The rotary motion is converted to axial motion through a unique high efficiency actuator that provides movement of the valves. Another desirable feature of the invention is a self-cleaning action of the valves due to the rotational movement of the shaft as it moves the valve between the open and closed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
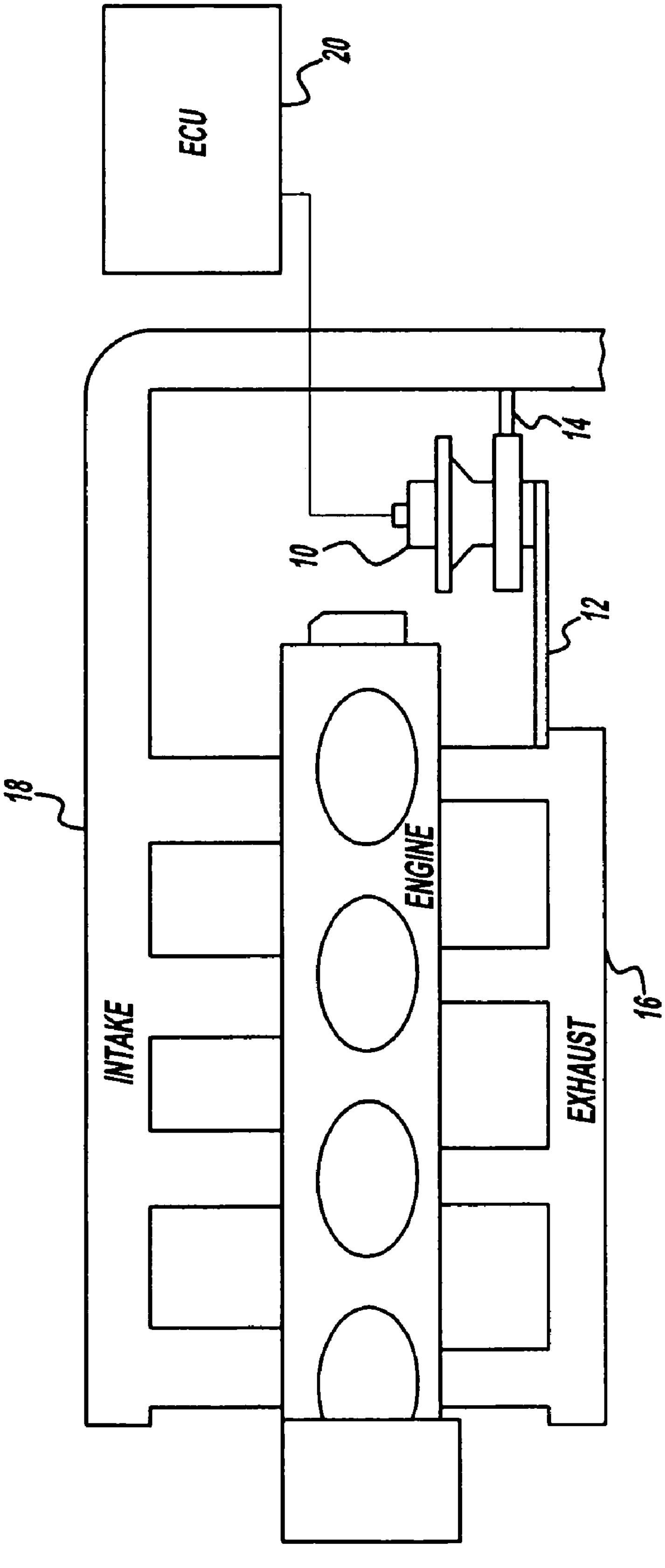
FIG. 1 is a schematic diagram of an engine having an EGR valve incorporated between the engine intake and exhaust passageways.

Referring to FIG. 1 a schematic diagram of an EGR system is depicted in accordance with the present invention. The system consists of an exhaust gas recirculation (EGR) valve 10 that controls the flow of exhaust gas to an intake manifold 18. An input passage 12 is connected between the EGR valve 10 and an exhaust manifold 16 of the engine. An output passage 14 is located between the EGR valve 10 and the intake manifold 18 of the engine. The input passage 12 and the output passage 14 serve as an interconnection allowing the EGR valve 10 to effectively control the flow of the exhaust gas in the engine.

The EGR valve 10 is an electronically controlled valve that is controlled by an engine control unit (ECU) 20. The ECU 20 provides a signal that will control the opening, closing and intermediate positioning of the EGR valve 10 in response to variables such as displacement of the engine and the engine load. As EGR valve 10 opens and closes it will increase or decrease respectively the flow rate of exhaust gas from the exhaust manifold 16 to the intake manifold 18. The exhaust gas can be metered by positioning the valve between open and closed positions.

Figure 2:
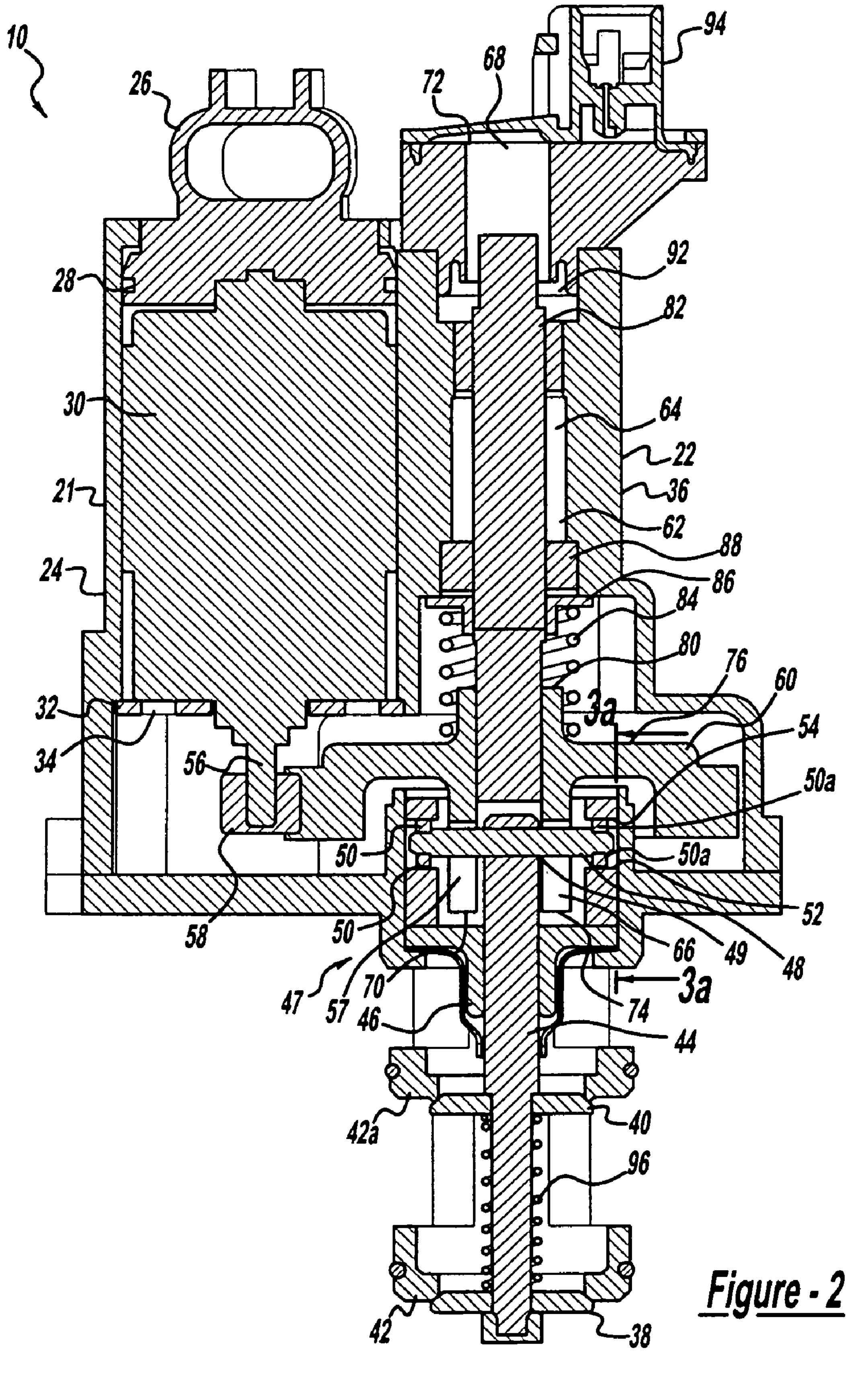
FIG. 2 is a cross-sectional view of the EGR valve of the present invention.

FIG. 2 depicts a cross-sectional view of the EGR valve 10 in accordance with the teachings of the present invention. The EGR valve 10 has an motor assembly 21 and a valve assembly 22. The motor assembly 21 has a housing 24 designed to accept an electrical connector 26. An elastomeric seal 28 is used to seal the connector 26 to the housing 24. A motor 30 is contained inside of the housing 24 and serves to actuate the valve assembly 22. A retaining plate 32 and screws 34 are used to connect motor 30 to the housing 24. Motor 30 is connected to electrical connector 26 which provides a source of power to actuate the motor 30.

Valve assembly 22 has a valve housing 36 that is connectable to the housing 24 of the motor assembly 21. The valve assembly 22 has a first valve member 38 and a second valve member 40 for selectively exhausting gas from the input passage 12 to the output passage 14. The first and second valve members 38, 40 each have a valve seat 42, 42*a* that define the opening between the input passage 12 and the output passage 14. The input passage 12 connects to the exhaust port from the engine. The output passage 14 connects to the air intake manifold which presents air to the engine for combustion. The first valve member 38 and the second valve member 40 are connected to a shaft 44 and move axially between open, closed or intermediate positions in response to the upward or downward movement of the shaft 44. The first and second valve members 38, 40 are in the closed position when they are seated against the valve seats 42, 42*a*, and are in the open position when they are unseated from the valve seats 42, 42*a*. The amount of exhaust gas moving from the input passage 12 to the output passage 14 will be the sum of the amount of gas moving past the first and second valve members 38, 40.

The shaft 44 is disposed through a valve bushing 46 which will guide the shaft 44 as it moves longitudinally between the valve open and closed positions. In order to facilitate the movement of a shaft 44, an actuator assembly 47 is disposed inside of the valve housing 36. The actuator assembly 47 includes an engagement member such as a pin 48 which extends from the valve shaft 44 and rides along a ramped slot formed in the valve housing 36. It is also possible for the pin 48 to be perpendicularly disposed through an engagement hole 49 extending through the top portion of the shaft 44. One end of the pin 48 has a first roller bearing 50*a* disposed thereon and a second end of the pin 48 has a second roller bearing 50 disposed thereon.

The first roller bearing 50*a* is slidably disposed in a first slot 53 and the second roller bearing 50 is disposed in a second slot 55, which are positioned 180° from one another. The first slot 53 and the second slot 55 each include a lower ramp surface 52 and an upper ramp surface 54 that guide the rotational and longitudinal movement of the shaft 44 as shown in FIG. 3*a*. The use of roller bearings 50, 50*a* on lower and upper ramp surfaces 52, 54 allows the shaft 44 to rotate upwardly and downwardly between the valve open and closed positions. While slots 53, 55 are shown engaging bearings 50 and 50*a* on opposite sides of the pin 48, a single pin and bearing and a single slot is also within the scope of the present invention. Preferably, two slots 53, 55 are provided for engaging both sides of the pin 48. However, more than two slots can be utilized if desired.

The use of roller bearings 50, 50*a* on lower and upper ramp surfaces 52, 54 allows the shaft 44 to rotate upwardly and downwardly between the valve open, closed and intermediate positions. The degree of incline of the lower ramp surface 52 and upper ramp surface 54 determines the rate at which the valve members 38, 40 move axially compared with the rotational movements. The degree of incline of the lower ramp surface 52 and upper ramp surface 54 can vary between zero degrees to eighty degrees. In a preferred embodiment as shown in FIG. 3*a* the slope is progressive from the fully closed to the fully opened position. At the valve opening side of the slot, the beginning angle of the ramp 'a' is generally from about 0 to about 20 degrees and preferably from about 0 to 10 degrees. This allows greater force for moving the valve away from the valve seat. The ramp increases in slope to an angle 'b' at the fully open position for providing more rapid opening of the valve toward the end of rotation of the valve shaft. The angle 'b' is generally from about 10 to about 80 degrees, typically from about 10 to about 60 degrees and preferably from about 20 to about 30 degrees. By keeping the angle at 0 degrees at the start of rotation the valve initially rotates on the seat allowing shearing of any fluid or substance on the valve seat. The zero angle rotation of the valve shaft can be maintained over and initial range of motion to ensure that any surface tension between the valve and the seat is sheared. This reduces the force necessary to break away from the seat since tensile separation is not used and allows cleaning of the seat. As shown in FIG. 3*a* the pin 48 may be stopped anywhere required along the ramps for providing infinite control of the opening of the valve assembly 22. However, more than two slots can be utilized if desired.

It is to be appreciated that the length of the slots may vary depending on the application such that the rotation of the valve shaft 44 is dependant on the length of the slot. In a preferred embodiment, the range of rotation is from about 45 degrees to about 120 degrees. In the embodiment illustrated herein the rotation of the shaft is 90 degrees the length of travel. However, greater rotational travel such as one to three or more rotations can be employed if desireable in a particular application.

The use of roller bearings 50, 50*a* on the ends of pin 48 reduces frictional loss that would occur between pin 48 and the surface of the lower ramp surface 52 and upper ramp surface 54. While this particular embodiment uses roller bearings 50, 50*a* to reduce friction loss, it should be understood that it is not always necessary to incorporate roller bearings 50, 50*a* in every application of this invention. For example, it is within the scope of the invention to have an embodiment that has no roller bearings 50, 50*a*.

The force for providing movement of the shaft 44 is supplied by a series of gears which are connected to the motor 30 of the actuator assembly 21. A motor shaft 56 protrudes from the motor 30 into the valve housing 24. The motor shaft 56 is configured to rotate bi-directionally about the longitudinal axis of motor shaft 56. A first gear 58 is connected to the motor shaft 56 and is configured to rotate in the same direction as the motor shaft 56. A second gear 60 is engageable with the first gear 58 and will rotate in the opposite direction of the motor shaft 56 and the first gear 58. The second gear 60 is connected to the pin 48 by way of a yoke portion 57 which has a slot for engaging the pin 48 in a rotational direction but allowing the pin to move in an axial direction in the slot. This rotates the pin 48 to along lower ramp surface 52 and upper ramp surface 54 in response to the rotation of the second gear 60.

Suitable motors for use in the present invention include brushed or brushless D.C. motors, stepper motors, torque motors, variable reluctance motors, pneumatic, hydraulic motors, and rotational solenoid and while not preferred an AC motor could be used or a linear solenoid actuator. While a gearing arrangement is shown for translating rotational movement from the motor to the valve shaft other methods of rotating the shaft can be utilized in the present invention. For instance the shaft could be directly rotated by the motor or the motor could be connected by way of a chain or belt drive or a rack and pinion arrangement. Additionally, the motor can be connected by way of a four bar link mechanism for rotating the shaft with a lever.

A bore 62 extends longitudinally inside of the valve housing 36. The bore 62 has a first end 68 and a second end 70 located distally from the first end 68. The bore 62 further includes an upper region 64 that is defined at a first end 72 by the first end 68 and a lower region 66 that is defined at a second end 74 and by the second end 70 of the bore 62.

The second gear 60 extends across the bore 62 and defines a second end 76 of the upper region 64 or the bore 62 and the first end 78 of the lower region 66 of the bore 62. The second gear 60 further includes a gear opening 80 for receiving a guide shaft 82. The guide shaft 82 functions to hold the second gear 60 in place against the pin 48 during the rotation of the second gear 60.

The guide shaft 82 extends from the gear opening 80 toward the first end 68 of the bore 62. A torsion spring 84 is placed over the guide shaft 82 between the second gear 60 and a spring bushing 86. The roller bearings 88 are positioned between the guide shaft 82 and the side wall of the bore 62. A guide shaft bushing 90 is positioned between the guide shaft 82 and side wall of the bore 62 near the end of the guide shaft 82 and functions to hold the guide shaft 82 in place during rotation. A washer end clip 92 rotatably secures the end of guide shaft 82 to the side wall of bore 62. Torsion spring provides a fail-safe return to closed position if the motor fails.

A position sensor 94 is affixed to the first end 68 of the bore 62. The position sensor 94 and the guide shaft 82 have interconnecting design features that will allow the position sensor 94 to provide an output signal based upon the degree of movement of the guide shaft 82. The position sensor 94 contains terminals for electrical connection to a suitable controller (not shown).

Figure 3:
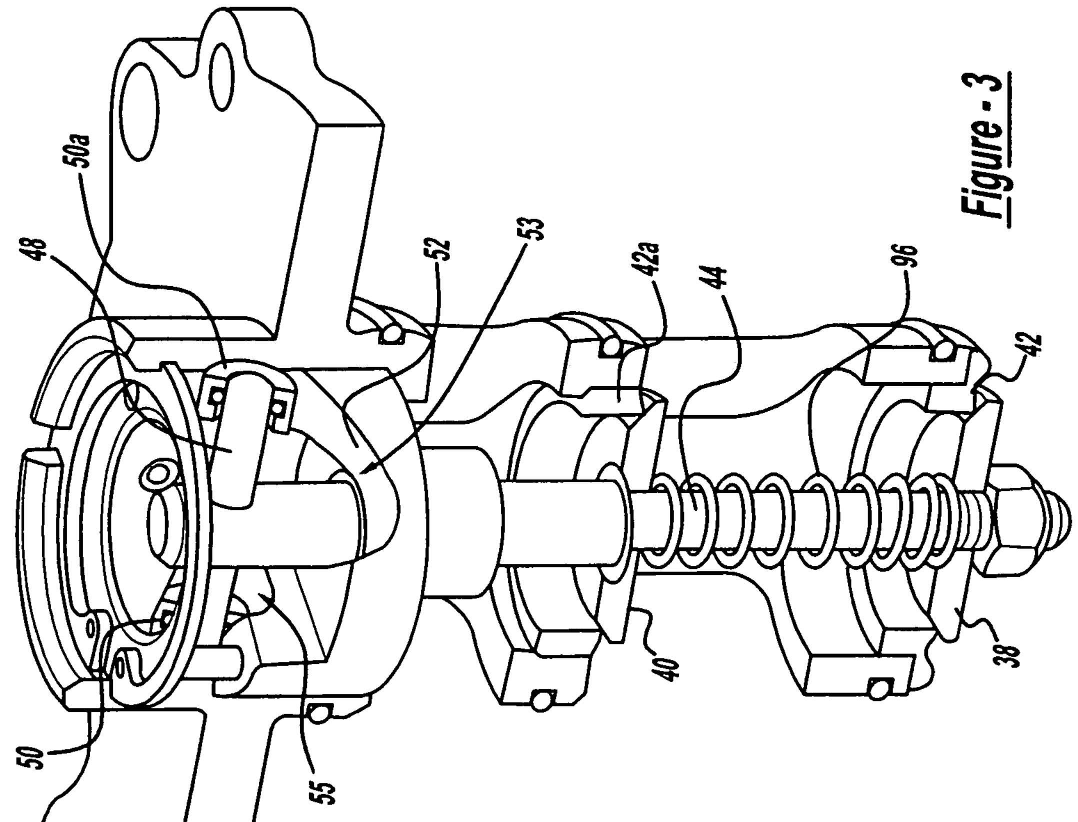
FIG. 3 is a partially broken away perspective view of the valve in the closed position.
Figure 3A:
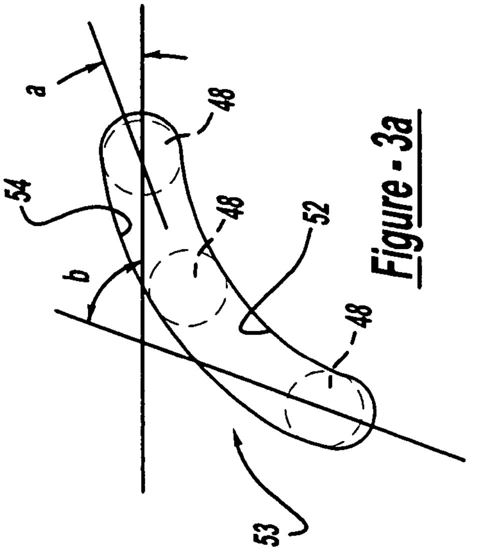
FIG. 3*a* is an illustrative view of the angles useful in the ramp of the present invention.

FIG. 3 is a partially broken away perspective view of the EGR valve 10 illustrating the EGR valve 10 in the closed position. One end of the pin 48 is slidably disposed on the lower ramp surface 52, while the second end of pin 48 is slidably disposed on the upper ramp surface 54. The roller bearings 88 are placed above and below the ends of pin 48. The bearings 88 allow the ends of pin 48 to slide along the lower and upper ramp surfaces 52, 54. The rollers will be configured to roller bearings 88 on the lower and upper ramp surfaces 52, 54.

Figure 4:
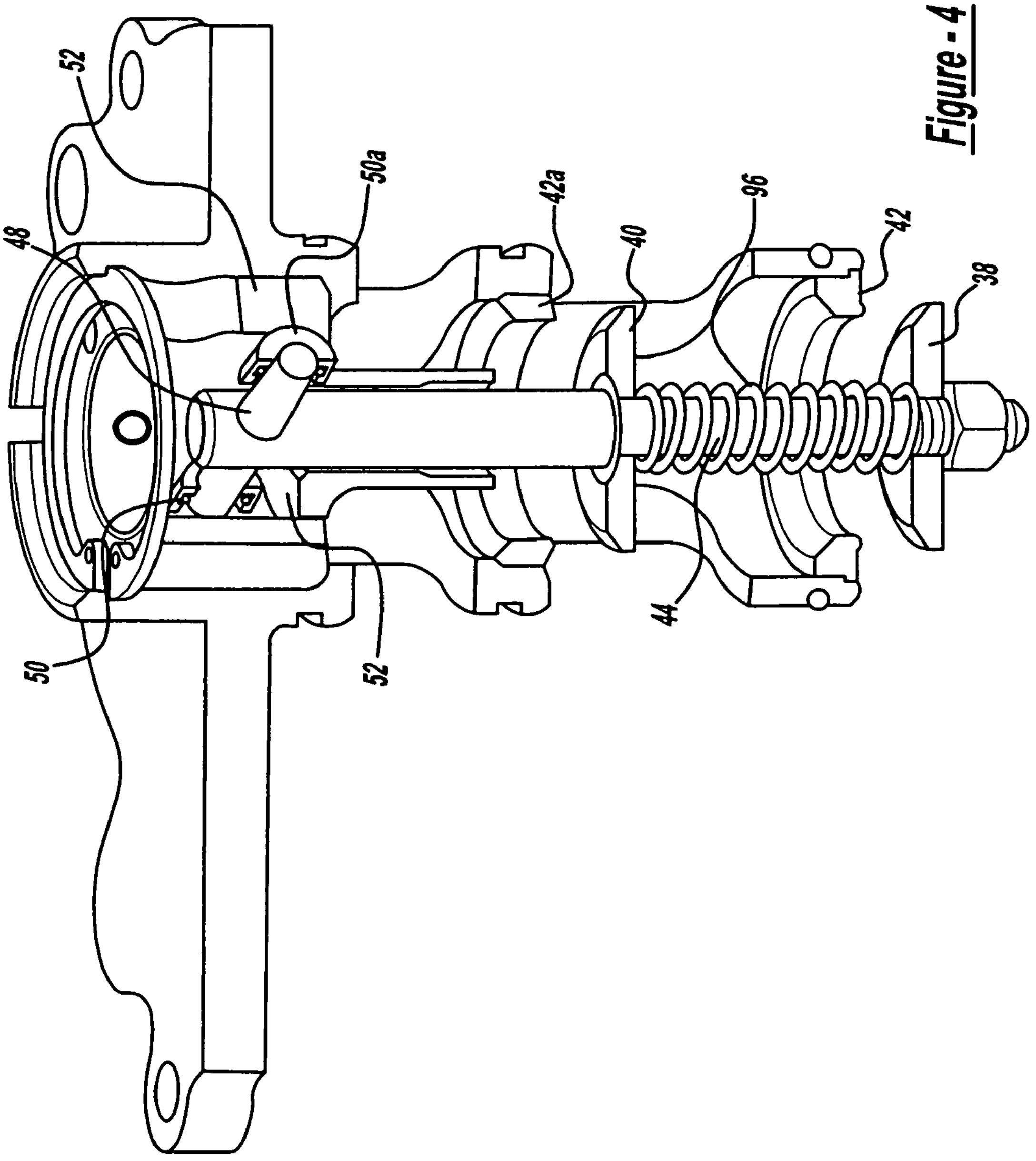
FIG. 4 is a partially broken away perspective view of the valve in the open position.

FIG. 4 is a partially broken away perspective view of the EGR valve 10 illustrating the EGR valve 10 in the open position. When second gear (not shown) rotates, the shaft 44 will also rotate so that the ends of pin 48 slide along lower and upper ramp surfaces 52, 54. As shaft 44 rotates the first and second valve members 38, 40 will move downward away from the valve seats 42, 42*a* to allow exhaust from the output 16 of the engine to move to the input passage 18 of the engine.

A valve spring 96 is disposed on the valve shaft 44 between the second valve member 40 and the first valve member 38. When the second valve member 40 is moved from the open position to the closed position the second valve member 40 contacts the second valve seat 42*a* and slides along the valve shaft 44 toward the first valve member 38 while the valve shaft 44 moves in the opposite direction toward the actuator assembly 47. The first valve member 38 is fixed to the end of the valve shaft 44 and does not slide. As the first valve member 38 moves toward the second valve member 40, which is now stationary since it is abutted against the second valve seat 42*a*, the first valve 38 member contacts the valve spring 96 and begins to slide the valve spring 96 upward toward the second valve member 40. The valve spring then abuts against and compresses against the second valve member 40 as the valve spring 96 becomes compressed between the first valve member and the second valve member 40. The first valve member 38 will finish compressing the valve spring 96 when the first valve member 38 is seated on the first valve seat 42.

The rotational movement of first and second valve members 38, 40 between the open and closed position causes the first and second valve members 38, 40 rotate against the valve seats 42, 42*a*. This functions to clean the first valve member 38 and second valve member 40 by rubbing off residue on the valve member 38, 40 and the valve seats 42, 42*a*.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle gaseous fluid metering device comprising:

a housing, adapted for routing of gas from an input passage to an output passage;

a valve assembly positioned inside said housing for selectively moving gas from said input passage to said output passage, said valve assembly including at least one valve seat acting as an opening between said input passage and said output passage, and at least one valve member operative with said valve seat and acting as a moveable barrier between said input passage and said output passage, wherein said valve member moves between a closed position and an open position;

a valve shaft connected to said at least one valve member, said valve shaft is operable for moving said at least one valve member in response to rotation of said valve shaft;

a pin extending from the valve shaft and engaging a ramp portion in said housing; and an actuator operably coupled to the valve shaft to provide driven translational movement of both the valve shaft and valve member in both an axial and a rotational direction wherein said at least one valve member radially rotates against said at least one valve seat prior to moving axially in order to self-clean said at least one valve member and said at least one valve seat.

2. The vehicle gaseous fluid metering device of claim 1 wherein any fluid substance on said at least one valve seat and said at least one valve member is sheared during the rotation of said at least one valve member.

3. The vehicle gaseous fluid metering valve of claim 1 wherein at least one valve member rotates from greater than 0 degrees to about 90 degrees prior to axial movement of said at least one valve member.

4. The vehicle gaseous fluid metering valve of claim 1 wherein said at least one valve member rotates over a range of 45 degrees to about 120 degrees over the range of axial motion.

5. The vehicle gaseous fluid metering device of claim 1 wherein said ramp portion is progressively angled from a first angle at a valve seat breaking end of said ramp portion to a second angle at a valve open end of said ramp portion.

6. The vehicle gaseous fluid metering device of claim 5 wherein said ramp portion has a first angle that is from about 0 to about 20 degrees and a second angle that is about from about 10 to about 80 degrees.

7. The vehicle gaseous fluid metering device of claim 6 wherein said first angle is from about 0 to about 10 degrees and second angle is from about 10 to about 60 degrees.

8. A method of operating a vehicle gaseous fluid metering device comprising the steps of:

providing a valve housing positioned between an input passage and an output passage;

providing a valve assembly having at least one valve seat and at least one valve member;

providing a valve shaft configured to move in an axial direction in response to rotation about its axis, said valve shaft coupled to said at least one valve member for moving of the at least one valve member in response to rotation of the shaft;

providing a pin extending from said valve shaft and engaging a ramp portion located in said valve housing;

providing an actuator operably coupled to the valve shaft to provide driven translational movement of both the valve shaft and valve member in both an axial and a rotational direction; and self-cleaning said at least one valve member and said at least one valve seat by radially rotating said at least one valve member against said at least one valve seat prior to moving said at least one valve member axially and during said opening and said closing of said valve assembly.

9. The method of claim 8 further comprising the step of:

opening said valve assembly by moving said valve shaft to an open position using said actuator assembly to simultaneously rotate and move said valve shaft in a longitudinal direction, whereby said at least one valve member moves to said open position by rotating and moving with said valve shaft away from said at least one valve seat.

10. The method of claim 9 further comprising the step of:

closing said valve assembly by moving said valve shaft to a closed position using said actuator assembly to rotate and move said valve shaft in a longitudinal direction, whereby said at least one valve member moves to said close position by rotation and moving with said valve shaft toward and subsequently seating against said at least one valve seat.

11. The method of claim 8 where said valve assembly has a first valve seat and a first valve member disposed on said valve shaft and operably engageable with said second valve seat, and a second valve seat and a second valve member disposed on said valve shaft and operably engageable with said second valve seat.

12. The vehicle gaseous fluid metering device of claim 1 wherein the rate of axial movement of said valve shaft and said valve member between said open position and said closed position is a function of the degree of incline of said ramp portion.

13. The vehicle gaseous fluid metering device of claim 1 further comprising a first roller bearing disposed on said pin wherein said roller bearing rides along said ramp portion during rotation of said valve shaft.

14. A valve comprising:

a housing adapted for routing of gas between an input passage to an output passage;

a valve seat positioned in said housing between said input passage and said output passage;

at least one valve member acting as a movable barrier between said input passage and said output passage, wherein said at least one valve member is operative with said valve seat and acts as a movable barrier between said input passage and said output passage;

an actuator operably coupled to said valve member to provide driven translational movement of the valve member in both an axial and a rotational direction wherein said at least one valve member radially rotates against said valve seat prior to moving axially in order to self-clean said at least one valve member and said valve seat; and a pin operably connected between said actuator and said at least one valve member, wherein said pin engages a ramp portion in said housing to guide the at least one valve member in both said axial and said rotational directions.

15. The valve of claim 14 wherein said at least one valve member rotates from greater than 0 degrees to about 90 degrees prior to axial movement of said at least one valve member when said valve member is seated against said valve seat.

16. The valve of claim 14 wherein said at least one valve member rotates over a range of 45 degrees to about 120 degrees over the range of axial motion.

17. The valve of claim 14 wherein the rate of axial movement of said at least one valve member between an open position and a closed position relative to said valve seat is a function of the decree of incline of said ramp portion.

18. The valve of claim 14 further comprising a first roller bearing disposed on said pin, wherein said roller bearing rides along said ramp portion during rotation of said pin.

19. The valve of claim 14 wherein said at least one valve member rotates from greater than 0 degrees to about 90 degrees prior to axial movement of said at least one valve member when said valve member is seated against said valve seat.

20. The valve of claim 14 wherein said at least one valve member rotates over a range of 45 degrees to about 120 degrees over the range of axial motion when said at least one valve member moves relative to said valve seat.

21. The valve of claim 14 wherein said valve member is configured to rotate against said valve seat to sheer off residue between said valve seat and said valve member.

22. A valve comprising:

a housing adapted for routing gas between an input passage to an output passage;

a valve seat positioned in said housing between said input passage and said output passage;

at least one valve member acting as a movable barrier between said input passage and said output passage located on one side of said valve seat;

an actuator positioned at the side of said valve seat opposite said at least one valve member;

a valve shaft operably connected to said actuator at one end and extending through said valve seat, wherein said valve shaft is connected to said at least one valve member, wherein said actuator is operably coupled to the valve shaft to provide driven translational movement of both the valve shaft and valve member in both an axial and a rotational direction;

a pin extending from the valve shaft and engaging a ramp portion in said housing; and wherein said valve member is configured to rotate against said valve seat prior to moving axially in order to shear off residue between said valve seat and said valve member.

23. The valve of claim 22 wherein said at least one valve member rotates from greater than 0 degrees to about 90 degrees prior to axial movement of said at least one valve member when said valve member is seated against said valve seat.

24. The valve of claim 22 wherein said at least one valve member rotates over a range of 45 degrees to about 120 degrees over the range of axial motion.

25. The valve of claim 22 wherein the rate of axial movement of said valve shaft and said valve member between an open position and a closed position is a function of the degree of incline of said ramp portion.

26. The valve of claim 22, further comprising a roller bearing disposed on said pin, wherein said roller bearing rides along said ramp portion during rotation of said valve shaft.

27. The valve of claim 22 wherein at least one valve member rotates from greater than 0 degrees to about 90 degrees prior to axial movement of said at least one valve member when said at least one valve member is positioned in a closed position against said valve seat.

28. The valve of claim 22 wherein said at least one valve member rotates over a range of 45 degrees to about 120 degrees over a range of axial motion of at least one valve member.

29. A vehicle gaseous fluid metering device comprising:

a housing, adapted for routing of gas between an input passage to an output passage;

a valve assembly positioned inside said housing for selectively moving gas from said input passage to said output passage, said valve assembly including at least one valve seat acting as an opening between said input passage and said output passage, and at least one valve member operative with said valve seat and acting as a moveable barrier between said input passage and said output passage, wherein said valve member moves between a closed position and an open position;

a valve shaft operably connected to said at least one valve member for moving said at least one valve member between said open and closed positions in response to rotation of said valve shaft;

a pin extending from the valve shaft and engaging a ramp portion in said housing; and an actuator operably coupled to the valve shaft to provide driven translational movement of both the valve shaft and the valve member in both an axial and a rotational direction, wherein said actuator and said valve shaft rotate simultaneously, wherein said at least one valve member radially rotates against said valve seat prior to moving axially in order to self-clean said at least one valve member and said valve seat.

30. The gaseous fluid metering device of claim 29 wherein the rate of axial movement of said valve shaft and said at least one valve member between said open position and said closed position is a function of the degree of incline of said ramp portion.

31. The vehicle gaseous fluid metering device of claim 29 further comprising a roller bearing disposed on said pin, wherein said roller bearing rides along said ramp portion during rotation of said valve shaft.

32. The vehicle gaseous fluid metering device of claim 29 wherein said at least one valve member rotates from greater than 0 degrees to about 90 degrees prior to axial movement of said at least one valve member when said valve member is in said closed position and is seated against said valve seat.

33. The vehicle gaseous fluid metering device of claim 29 wherein said at least one valve member rotates over a range of 45 degrees to about 120 degrees over the range of axial motion of said at least one valve member.

* * * * *